United States Patent [19]
Huang et al.

[11] Patent Number: 5,991,114
[45] Date of Patent: Nov. 23, 1999

[54] DISC DRIVE HAVING GRAM LOAD REDUCER AND METHOD OF OPERATING GRAM LOAD REDUCER

[75] Inventors: He Huang, Eden Prairie; Lei Zhang, Edina; Ling Wang, Minneapolis, all of Minn.

[73] Assignee: Seagate Technology, Inc., Scotts Valley, Calif.

[21] Appl. No.: 08/855,678

[22] Filed: May 14, 1997

Related U.S. Application Data

[60] Provisional application No. 60/035,723, Jan. 28, 1997.

[51] Int. Cl.$^6$ .................................................. G11B 21/02
[52] U.S. Cl. ........................................... 360/75; 360/105
[58] Field of Search .................................. 360/104, 105, 360/109, 75, 69, 70, 107

[56] References Cited

U.S. PATENT DOCUMENTS

| 3,863,124 | 1/1975 | Pierce et al. .............................. 318/638 |
| 3,914,541 | 10/1975 | Elliot ..................................... 178/6.6 R |
| 4,314,295 | 2/1982 | Frandsen ................................. 360/106 |
| 4,605,977 | 8/1986 | Matthews ................................ 360/103 |
| 4,802,033 | 1/1989 | Chi ....................................... 360/77.04 |
| 5,055,731 | 10/1991 | Nihei et al. ............................. 310/309 |
| 5,079,652 | 1/1992 | Ishida et al. ............................. 360/75 |
| 5,185,681 | 2/1993 | Volz et al. ............................. 360/77.05 |
| 5,189,378 | 2/1993 | Arai ....................................... 360/106 |
| 5,216,559 | 6/1993 | Springer ................................. 360/106 |
| 5,257,149 | 10/1993 | Meyer ................................... 360/78.14 |
| 5,303,105 | 4/1994 | Jorgenson .............................. 360/106 |
| 5,452,151 | 9/1995 | Money et al. ............................. 360/75 |
| 5,521,778 | 5/1996 | Boutaghou et al. ..................... 360/106 |
| 5,719,720 | 2/1998 | Lee ......................................... 360/75 |
| 5,828,512 | 10/1998 | Wada et al. ............................. 360/75 |

FOREIGN PATENT DOCUMENTS 0 549 814 A1   7/1993   European Pat. Off. .

OTHER PUBLICATIONS

Edward G. Grochowski, Roger F. Hoyt and John S. Heath, "Magnetic Hard Disk Drive Form Factor Evolution", *International Conference on Advanced Mechatronics*, Tokyo, Japan, Aug. 1993, pp. 521–526.

Takeshi Ohwe, Yoshifumi Mizoshita and Seiji Yoneoka, Development of Integrated Suspension System for a Nanoslider with MR Head Transducer, Feb. 15, 1993.

*Primary Examiner*—Thang V. Tran
*Attorney, Agent, or Firm*—Westman, Champlin & Kelly, P.A.

[57] ABSTRACT

An actuator assembly in a disc drive includes a track accessing arm, a load beam and a slider. A proximal end of the load beam is mounted to the track accessing arm and a distal end of the load beam carries the slider proximate to a rotatable data storage disc. The load beam transmits a load force to the slider in the direction of the data storage disc. A support beam extends from the track accessing arm and supports a load force reducer between the support arm and the load beam. The load force reducer is operatively coupled between the support beam and the load beam for reducing the load force during take-off and landing of the slider relative to the disc surface.

11 Claims, 8 Drawing Sheets

DISC DRIVE HAVING GRAM LOAD REDUCER AND METHOD OF OPERATING GRAM LOAD REDUCER

CROSS-REFERENCE TO RELATED APPLICATION

This application claims priority from U.S. Provisional Application Ser. No. 60/035,723, which was filed on Jan. 28, 1997 and is entitled "Gramload Releaser and Controller Built Onto Head Suspension/Stack Assembly For Magnetic Hard Disk Drives."

BACKGROUND OF THE INVENTION

The present invention relates to a disc drive storage system and, in particular, to a disc drive storage system having a head suspension assembly with a gram load reducer.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track to track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes an air bearing surface which faces the disc surface. As the disc rotates, the disc drags air under the slider and along the air bearing surface in a direction approximately parallel to the tangential velocity of the disc. As the air passes beneath the air bearing surface, air compression along the air flow path causes the air pressure between the disc and the air bearing surface to increase which creates a hydrodynamic lifting force that causes the slider to lift and fly above the disc surface. This process is known as slider "take-off". A suction force may also be created between the disc and the air bearing surface, depending upon the geometry of the air bearing surface. The load force supplied by the load beam and the suction force counteract the hydrodynamic lifting force. The load force, the suction force and the hydrodynamic lifting force reach an equilibrium based upon the geometry of the slider and the speed of rotation of the disc. This equilibrium determines the flying height of the slider, and thus the resolution of the read and write transducer carried by the slider.

One of the major technical challenges for the design of head gimbal assemblies is to maintain a desirably low and flat flying height profile over the disc surface and to reduce mechanical interference between the head and disc. A low and flat fly height profile is achieved in part by providing the slider with an air bearing having a high stiffness. Unfortunately, this may lead to an undesired level of mechanical interference between the head and disc during take-off and landing. Also, the larger the load force, the higher the rotational velocity the disc must reach before the slider will lift and fly above the disc surface. A prolonged period of contact between the slider and the disc surface causes wear of the slider, the transducer and the disc surface.

Several attempts have been made to reduce mechanical interference between the head and disc, but these attempts have not reduced the interference dramatically. For example, a typical magnetic disc is coated with a thin layer of lubricant for reducing wear at the head and disc interface. However, when the disc stops rotating and the slider rests on the disc surface, the lubricant tends to pull the slider and the disc surface together by the action of meniscus surface tension. Since the stiction force must be overcome before the disc can move relative to the slider, the stiction force adversely affects contact start and stop (CSS) performance of the slider. This stiction force has been reduced slightly by texturing the take-off and landing zone of the disc surface. The preload force applied to the slider, however, remains one of the largest contributors to stiction.

SUMMARY OF THE INVENTION

In the disc drive of the present invention, the actuator assembly includes a track accessing arm, a load beam and a slider. A proximal end of the load beam is mounted to the track accessing arm and a distal end of the load beam carries the slider proximate to a rotatable data storage disc. The load beam transmits a load force to the slider in the direction of the data storage disc. A support beam extends from the track accessing arm and supports a load force reducer between the support arm and the load beam. The load force reducer is operatively coupled between the support beam and the load beam for reducing the load force during take-off and landing of the slider relative to the disc surface.

In one embodiment, the load force reducer includes an electromagnet operatively coupled between the support beam and the load beam for selectively applying a bending force to the load beam. In another embodiment, the load force reducer includes a stack of piezoelectric elements coupled between the support beam and the load beam. The load force reducer can be controlled as a function of one or more operating parameters, such as the velocity of the disc, the mechanical interference between the slider and the disc, the operating shock on the disc drive housing, the amplitude of the readback signal, or whether the head is in a read mode or a write mode. The control function can be open-loop or closed-loop.

DETAILED DESCRIPTION OF THE PREFERRED EMBODIMENTS

Figure 1:
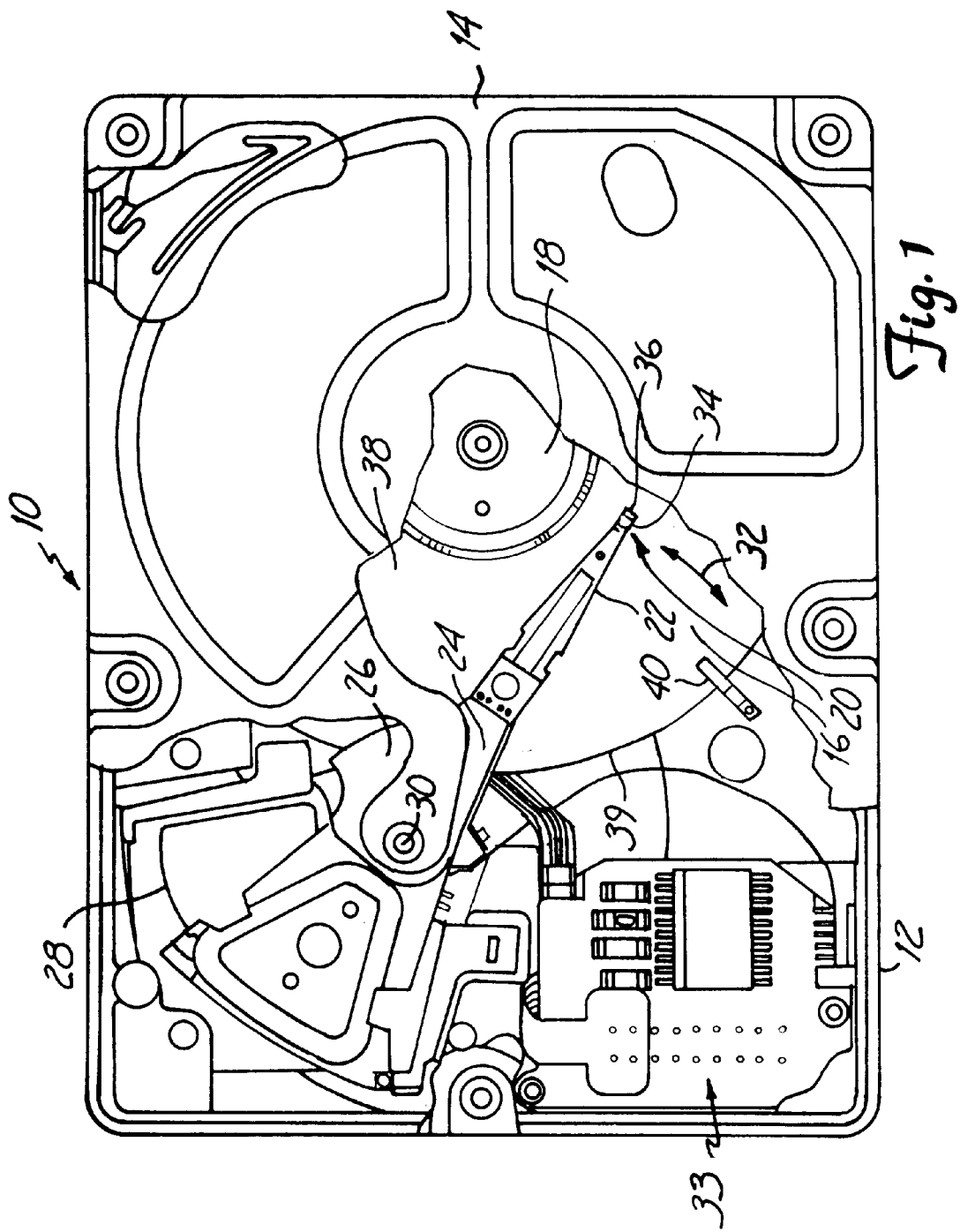
FIG. 1 is a top plan view of a disc drive data storage device according to the present invention.

FIG. 1 is a plan view of a disc drive 10 having a load force reducer according to the present invention. Disc drive 10 includes a housing with a base 12 and a top cover 14 (sections of top cover 14 are removed for clarity). Disc drive 10 further includes a disc pack 16, which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communication with the disc surface. Each HGA 20 includes a gimbal 34 and a slider 36. In the example shown in FIG. 1, HGAs 20 are supported by load beam flexures 22 which are in turn attached to track accessing arms 24 of an actuator 26 assembly. The gimbal and the load beam flexure are together referred to as a suspension.

The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position HGA 20 over a desired data track under the control of electronic circuitry 33. HGA 20 travels along an arcuate path 32 between a disc inner diameter (ID) 38 and a disc outer diameter (OD) 39.

Figure 2:
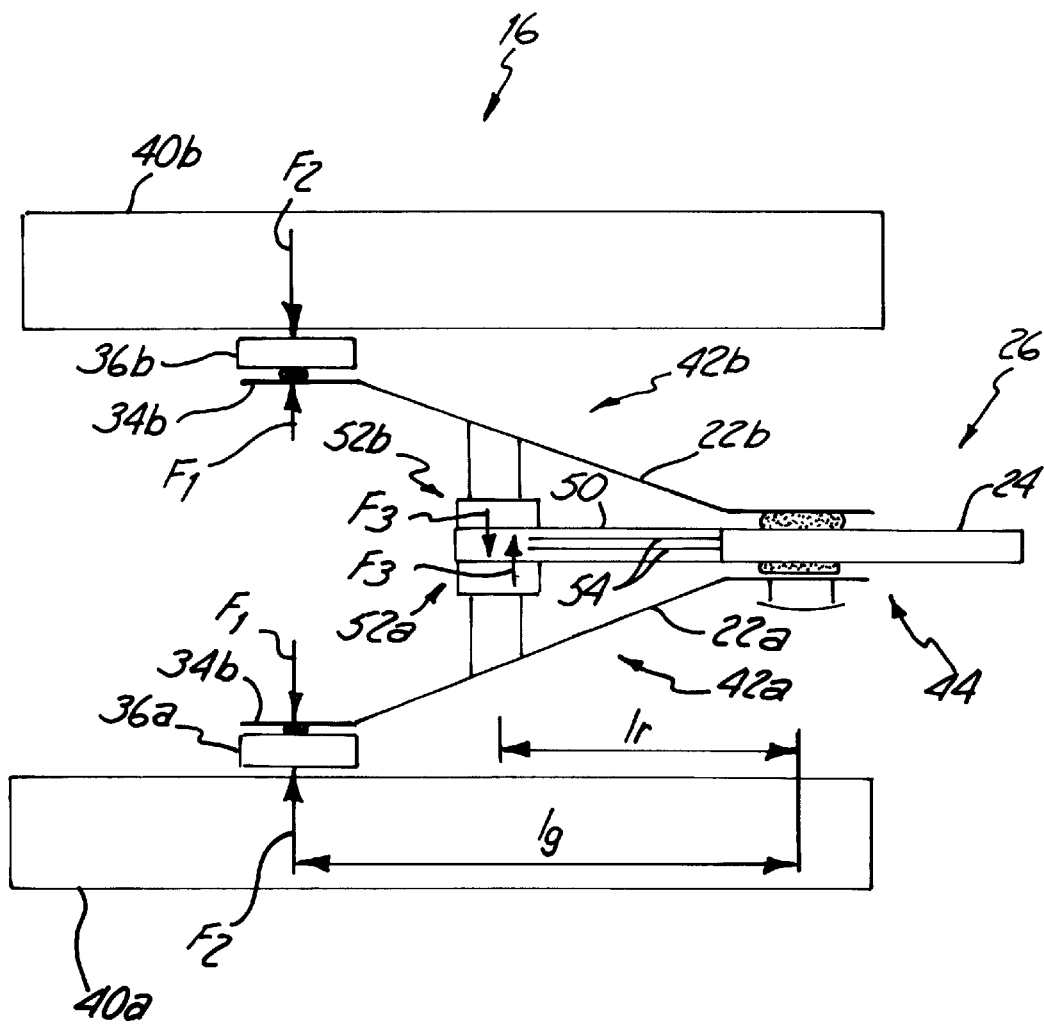
FIG. 2 is a simplified schematic representation of a partial side view of a disc pack and actuator assembly having a load force reducer according to the present invention.

FIG. 2 is a simplified schematic representation of a partial side view of disc pack 16 and actuator assembly 26. Disc pack 16 includes discs 40a and 40b. Actuator assembly 24 includes track accessing arm 24, suspensions 42a and 42b and extended support arm 50. Suspensions 42a and 42b support sliders 36a and 36b proximate to surfaces of discs 40a and 40b, respectively. Suspension 42a includes load beam 22a and gimbal 34a. Gimbal 34a can be integrated within the distal end of load beam 22a or formed of a separated piece of material attached to load beam 22a. The proximal end of load beam 22a is mounted to track accessing arm 24 through a swage mount shown schematically at 44. Similarly, suspension 42b includes load beam 22b and gimbal 34b. Load beam 22b is mounted to an opposite side of track accessing arm 24 than load beam 22a.

Load beams 22a and 22b apply a normal load force or "gramload" $F_1$ to sliders 36a and 36b which force the sliders toward the surfaces of discs 40a and 40b. Sliders 36a and 36b include air bearing surfaces which face the surfaces of discs 40a and 40b. As the discs begin to rotate, the discs drag air under sliders 36a and 36b and along the air bearing surfaces. Skin friction on the air bearing surfaces causes the air pressure between the discs and the air bearing surfaces to increase which creates a hydrodynamic lifting force $F_2$ that causes the sliders to lift and fly above the disc surfaces. This process is known as slider "take-off". The load force $F_1$ applied by load beams 22a and 22b counteracts the hydrodynamic lifting force $F_2$ to determine the flying height of each slider.

Support beam 50 extends from track accessing arm 24 toward the distal ends of load beams 22a and 22b. In one embodiment, support beam 50 and track accessing arm 24 are formed of a single continuous piece of material. In an alternative embodiment, support beam 50 is a separate piece of material attached to the distal end of track accessing arm 24 or through swage mount 44. Support beam 50 can also be formed as an extension from a base plate within swage mount 44.

Microactuators 52a and 52b are operably coupled between support beam 50 and load beams 22a and 22b, respectively, and are controlled by control signals applied to wires 54. Wires 54 are carried by support beam 50. Several types of microactuators can be used with the present invention, such as electromagnetic microactuators, piezoelectric microactuators and electrostatic microactuators.

When actuated, microactuators 52a and 52b apply a lifting force $F_3$ to load beams 22a and 22b which selectively bends load beams 22a and 22b in an axial direction away from the surfaces of discs 40a and 40b, which reduces the load force $F_1$ applied to sliders 34a and 34b by load beams 22a and 22b. Microactuators 52a and 52b can therefore be used to reduce the load force and thus the mechanical interference between sliders 36a and 36b and the surfaces of discs 40a and 40b during take off and landing. After take-off or landing, the load force $F_1$ can be returned to a relatively high value by removing the lifting force $F_3$.

With the present invention, the actual load force $F_a$ applied to each slider is defined by:

$$F_a = F_1 - F_3 \frac{\lambda_{R-G}(E, v, l_g, l_r, \ldots)}{k_g} \qquad \text{Eq. 1}$$

Where $F_1$ is the nominal load force when $F_3$ equals zero, $F_3$ is the lifting force applied by microactuators 52a and 52b, $k_g$ is the suspension spring rate, or deflection stiffness, with respect to load force reducers 52a and 52b at gimbals 34a and 34b, $\lambda_{R-G}$ is the relative microactuator-to-gimbal stiffness, or deflection, at the gimbal pivot point upon a unit of lifting force applied by load force reducers 52a and 52b. The suspension spring rate $k_g$ is typically provided by the suspension manufacturer. The relative microactuator-to-gimbal stiffness $\lambda_{R-G}$ can be calculated through a finite element model structural analysis as a function of various parameters such as the Young's modulus E of the suspension, the poisson ratio v of the suspension, the distance $1_g$ between swage mount 44 and the pivot point of gimbal 34a and the distance $1_r$ between swage mount 44 and load force reducers 52a and 52b, for example.

Figure 3:
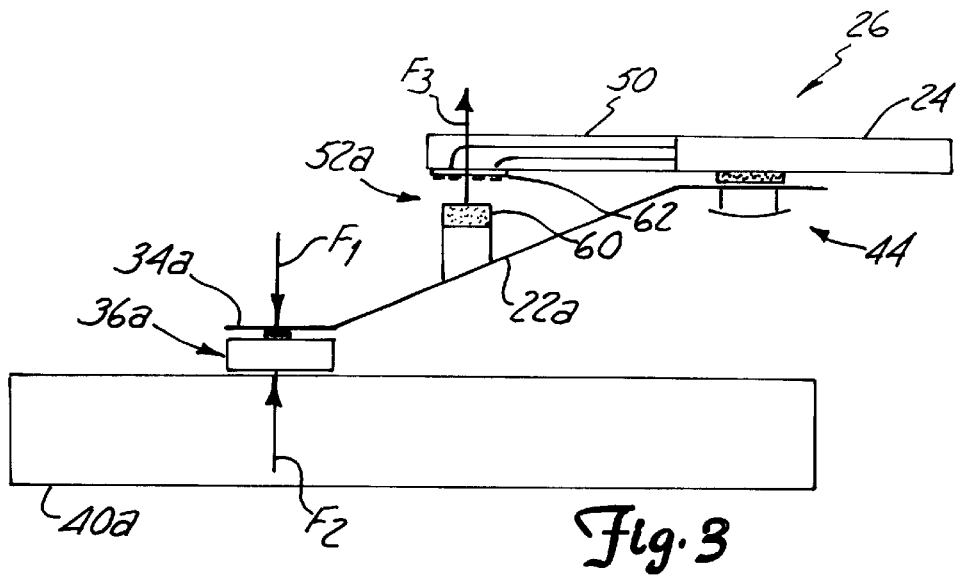
FIGS. 3, 4 and 5 are schematic representations of a disc and actuator assembly in which the load force reducer includes an electromagnetic microactuator, a stack of piezoelectric elements and a bimorph, respectively.

FIG. 3 is a schematic representation of actuator assembly 26, which has an electromagnetic microactuator operatively coupled between support beam 50 and load beam 22a according to one embodiment of the present invention. For simplicity, only one load beam and microactuator are shown. The same reference numerals are used in FIG. 3 as were used in FIG. 2 for the same or similar elements. Several types of electromagnetic microactuators can be employed, such as a moving coil or a moving magnet microactuator. A moving magnet microactuator is preferred over a moving coil microactuator since a large current is needed for operating a moving coil, which may cause thermally induced bending or buckling in load beam 22a.

In FIG. 3, microactuator 52a includes a moving magnet microactuator which is formed of a permanent magnet 60 and planar coil structure 62. Permanent magnet 60 has a vertical magnetization along the z-axis and is mounted on the moveable load beam 22a. Planar coil structure 62 is electroplated on a substrate, such as silicon, which is bonded to support beam 50. The vertical force $F_3$ acting on magnet 60 with vertical magnetization $M_z$ and volume V is given by:

$$F_3 = M_z \int \frac{d}{dz} H_z dv \qquad \text{Eq. 2}$$

Where $H_z$ is the vertical component of the magnetic field produced by planar coil structure 62. The electromagnetic force is proportional to the volume of the magnet. By switching the current direction in planar coil structure 62, the magnetic flux generated by the coil can either pull or push magnet 60 and thus bend load beam 22a up or down in a controlled manner.

Support beam 50 should be sufficiently stiff to hold planar coil structure 62, and the thickness of the beam is selected to leave enough space to mount the microactuator between support beam 50 and load beam 22a. In embodiments in which there are two microactuators mounted on either side of support beam 50, such as the embodiment shown in FIG. 1, the thickness of support beam 50 can be significantly reduced since the lifting forces applied by each microactuator cancel one another at the support beam. Although any magnet can be used with the present invention, electroless plated or electroplated Co-based alloys, such as CoMnP or CoNiMnP, are preferred magnetic media for magnet 60 since they show good vertical magnetic anisotropy and a high vertical coercivity in perpendicular magnetic recording.

Figure 4:
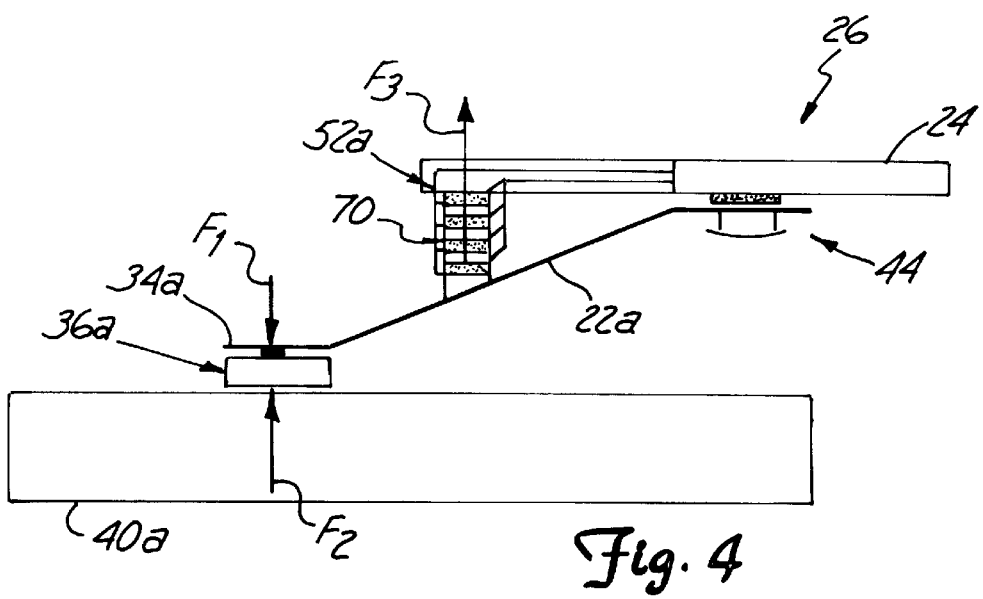

In the embodiment shown in FIG. 4, microactuator 52a includes a plurality of stacked piezoelectric elements 70 which are electrically coupled in parallel and bonded between support beam 50 and load beam 22a. Piezoelectric elements 70 expand and contract axially in a direction normal to disc 40a as a function of an applied voltage for increasing and decreasing the load force $F_1$ applied to slider 36a by load beam 22a. In this embodiment, support beam 50 is preferably stiff enough that deflection of arm 50 is small compared with that of load beam 22a. In general, piezoelectric microactuators can generate a sufficiently large force to push or pull load beam 22a with a displacement of about 10 nm per volt. With a nominal fly height in the range 20–50 nm, only a low voltage is required to drive the piezoelectric elements 70 and thus control the fly height of slider 36a.

Figure 5:
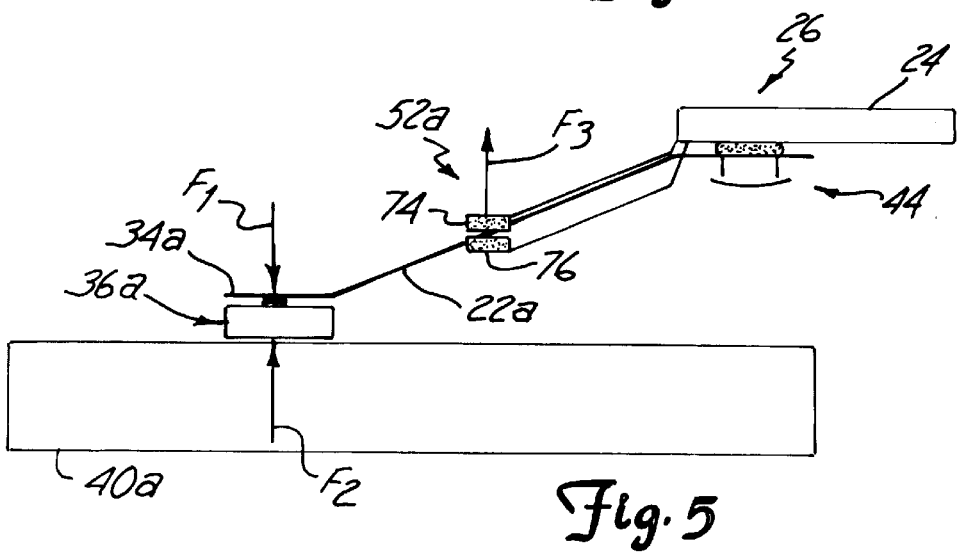

FIG. 5 illustrates another alternative embodiment of the present invention which uses a bimorph device for selectively reducing the load force $F_1$ applied by load beam 22a. The bimorph device includes two piezoelectric elements 74 and 76 which are attached to opposite surfaces of load beam 22a with an adhesive. Piezoelectric elements 74 and 76 are polarized such that when one element expands along a longitudinal axis of load beam 22a, the other contracts along the longitudinal axis causing load beam 22a to bend vertically with respect to the surface of disc 40a. Although the structure of the bimorph device is simple, the displacement of the microactuator is only a few nm per volt.

Figure 6:
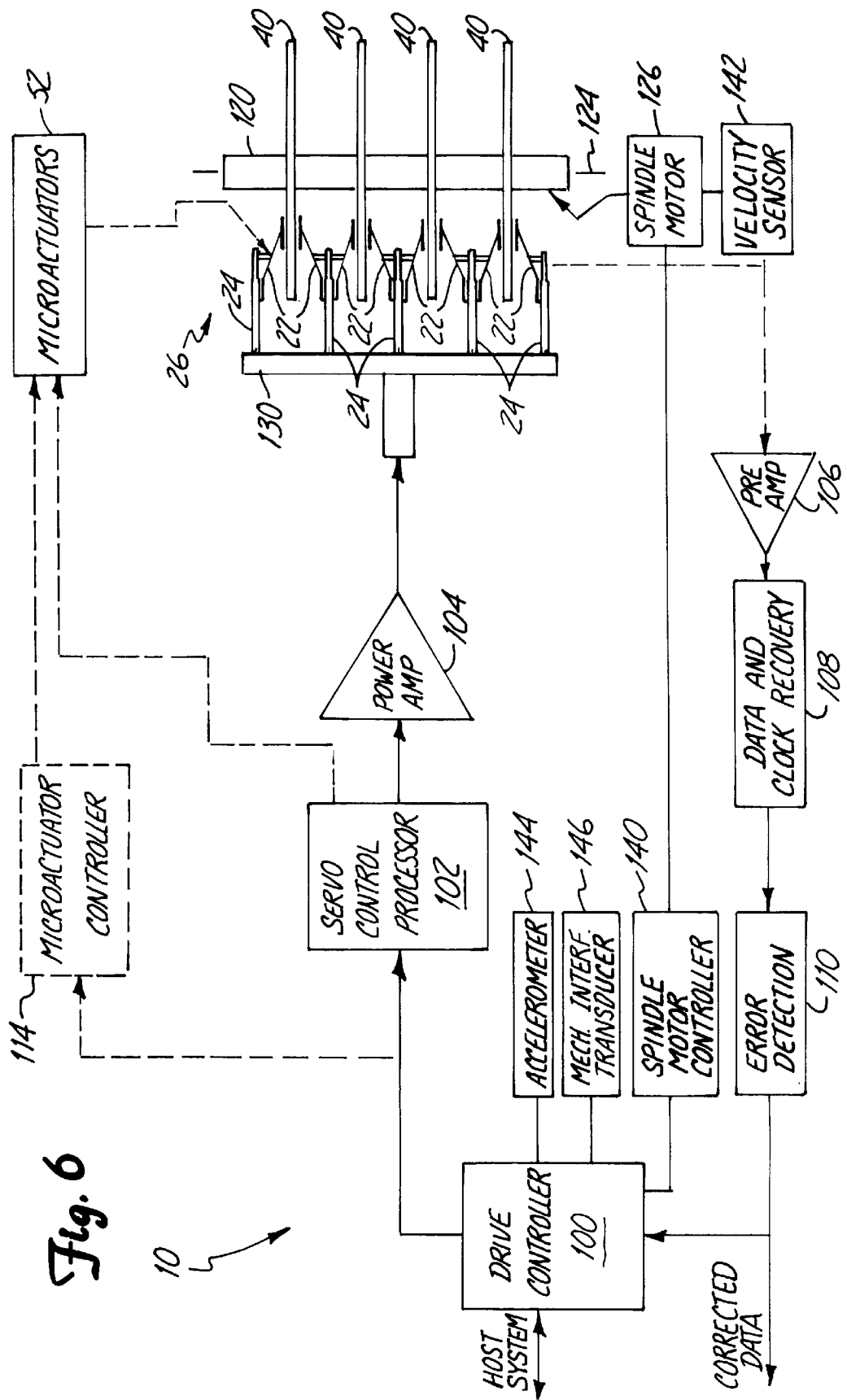
FIG. 6 is a block diagram of the disc drive which illustrates servo and load force reducer control circuitry.

FIG. 6 is a block diagram of disc drive 10, which illustrates the control circuitry for the servo and load force reducing operations in greater detail. Disc drive 10 includes drive controller 100, servo control processor 102, power amplifier 104, actuator assembly 26, disc pack 16, preamplifier 106, data and clock recovery circuit 108, error detection circuit 110, spindle motor 126 and spindle motor controller 140. Drive controller 100 is typically a microprocessor or digital computer, and is coupled to a host system or another drive controller which controls a plurality of drives.

Disc pack 16 includes spindle 120 which supports a plurality of coaxially arranged discs 40. Spindle motor 126 rotates discs 40 about axis 124 under the control of spindle motor controller 140. Each disc 40 has first and second surfaces with concentric data tracks for storing data in the form of flux reversals which are encoded on the tracks.

Actuator assembly 26 includes base 130 which supports the plurality of track accessing arms 24. Each of the track accessing arms 24 is coupled to at least one of the load beams 22, which supports a slider proximate to a corresponding disc surface for accessing data within the tracks on the disc surface. Each track accessing arm 24 carries at least one microactuator 52, as described above, for selectively reducing the load force applied by the respective load beam 22.

At start-up, drive controller 100 provides a start command to spindle motor controller 140. In response, spindle motor controller 140 applies a drive current to spindle motor 126 which causes spindle 120 and its attached discs 40 to begin rotating about axis 124. When the discs reach a "take-off velocity", the sliders lift and fly above the disc surfaces. A velocity sensor 142 is coupled to motor 126 for measuring the rotational velocity of discs 40.

At shut-down, spindle motor controller 140 removes the drive current from spindle motor 126, and discs 122 decelerate. As the discs reach a "landing velocity", the sliders land onto the disc surfaces, typically within a predetermined landing zone, and thereafter slide on the disc surfaces until the disc comes to a complete stop.

A large stiction force is observed between each slider and its disc surface during take-off and landing. Microactuators 52 release the load force on the slider during take-off and landing and thereby reduce the stiction force and thus prevent severe wear on the slider, the head carried by the slider, and the disc surface.

An open-loop or closed loop control function can be used to control microactuators 52. The control function can be implemented within drive controller 100, servo control processor 102 or an optional, separate microactuator controller 114. Microactuator controller 114 can be mounted with the electronic circuitry 33 (shown in FIG. 1) within the disc drive housing, on actuator assembly 26, or in-situ with each of the microactuators.

Microactuators 52 can be controlled as a function of one or more of the disc drive operating parameters, such as velocity measurements provided by velocity sensor 142, operating shock measurements provided by an accelerometer 144 mounted to disc drive 10, and mechanical slider-disc interference measurements provided by a transducer 146 carried by one or more of the sliders.

Figure 7:
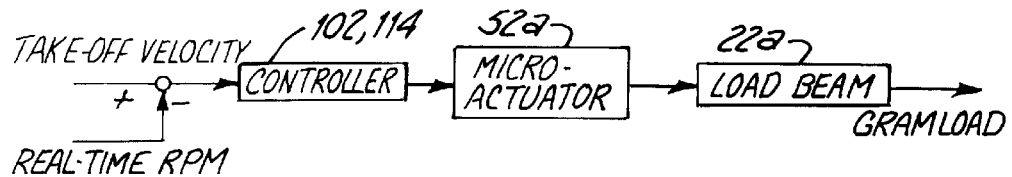
FIG. 7 is a diagram of an open-loop take-off control system according to one embodiment of the present invention.

FIG. 7 is a diagram of an open-loop take-off control system according to one embodiment of the present invention. The real-time spindle velocity measured by velocity sensor 142 is compared with the take-off velocity of the slider by drive controller 100. The take-off velocity is a predetermined value that is stored in a memory associated with the control circuity of disc drive 10. The take-off velocity is defined as the spindle velocity at which the slider just takes off from the disc surface and can be found by experiment or simulation. When the spindle velocity is less than the take-off velocity, controller 102 or 104 actuates microactuator 112 to reduce the load force applied by load beam 22. When the spindle velocity reaches the take-off velocity, controller 102 or 114 deactuates microactuator 112 to resume the load force applied by load beam 22.

Figure 8A:
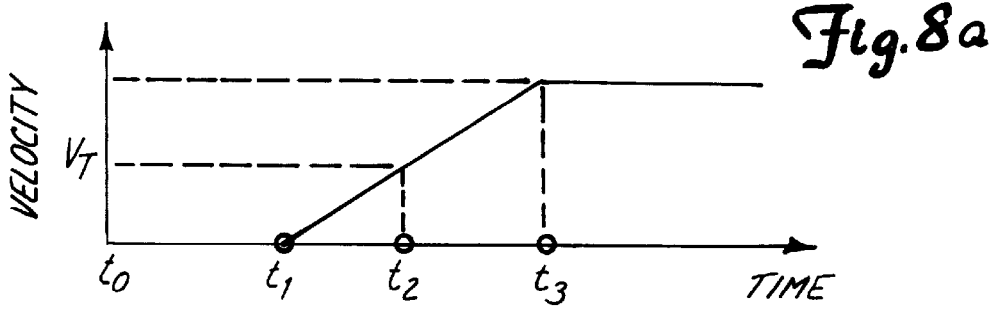
FIGS. 8a–8d are graphs illustrating spindle velocity, load force, release force and mechanical interference, respectively, over time.
Figure 8B:
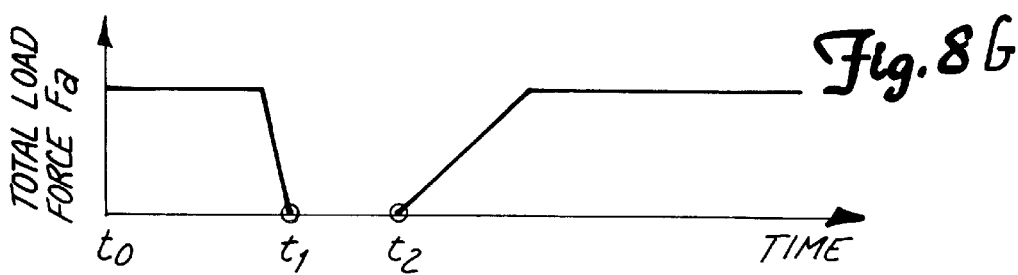

FIGS. 8a–8d are graphs illustrating the spindle velocity, the total load force applied by load beam 22, the release force applied by microactuator 52, and the mechanical interference between the slider and the disc surface, respectively, over time. At time T0, the spindle velocity is zero, the load force $F_a$ is at a maximum value, the release force $F_3$ is zero and the mechanical interference is at a background level. At time T1, the spindle begins rotating. Just prior to time T1, controller 102 or 114 actuates microactuators 52 to begin applying the release force $F_3$ to load beams 22, and the release force $F_3$ ramps toward a maximum, negative value relative to the load force $F_a$. This reduces the load force $F_a$ to a minimum value, such as zero, as shown in FIG. 8b. As the disc begins to rotate, the mechanical interference between the slider and the disc increases and then decreases as the load force $F_a$ reduces to the minimum value.

Figure 8C:
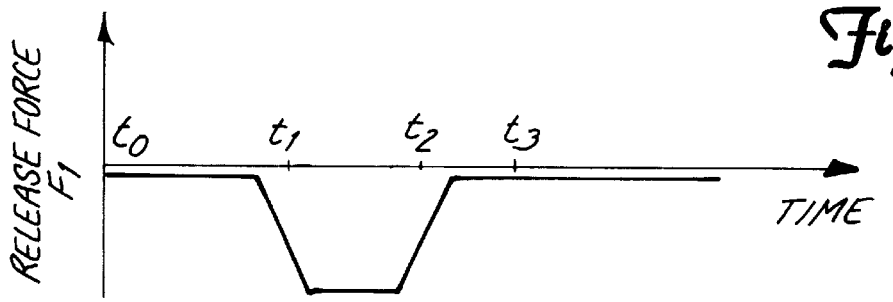

At time T2, the spindle velocity reaches the slider take-off velocity $V_T$. Controller 102 or 114 ramps the release force $F_3$ back to zero, as shown in FIG. 8c. The load force $F_a$ applied by load beam 22 therefore ramps back toward its maximum value as the spindle velocity reaches the operating RPM at time T3. The mechanical interference drops back to the background level, which is a function of the aerodynamic and suspension vibration experienced by the slider.

The sequence is reversed during landing. As the spindle velocity decreases, just prior to reaching the landing velocity, controller 102 or 114 ramps the release force $F_3$ toward a maximum value which reduces the load force $F_a$ applied by load beam 22. Once the spindle velocity reaches zero, the release force $F_3$ is removed and the load force $F_a$ applied by load beam 22 returns to its maximum value to protect the head gimbal assembly from operating shock experienced when the disc drive is turned off.

Figure 9:
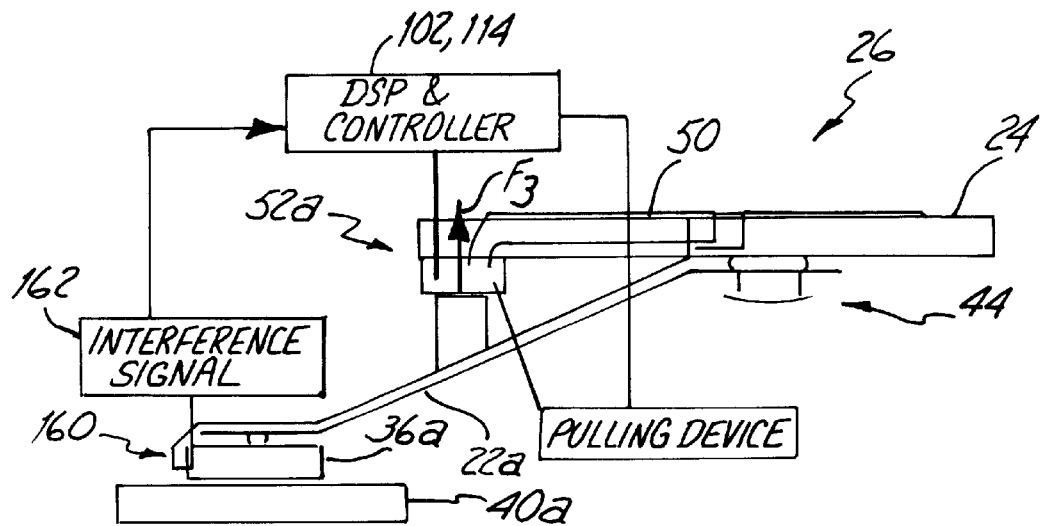
FIG. 9 is a simplified schematic diagram of a disc and actuator assembly having closed loop control of the load force as a function of the mechanical interference between the slider and the disc.

FIG. 9 is a simplified schematic diagram of an actuator assembly having closed loop control of the load force as a function of the mechanical interference between slider 36a and disc 40a. In addition to a traditional read and write head, slider 36a carries a transducer 160 which measures the level of mechanical interference between slider 36a and the surface of disc 40a as slider 36a is in sliding contact with disc 40a or its asperities. Transducer 160 generates a signal 162 which is representative of the magnitude of the interference. Signal 162 is coupled in a feedback loop to controller 102 or 114, which is in turn coupled to microactuator 52a.

Transducer 162 can include a PZT sensor which is mounted such that the output of the PZT sensor varies with the vibration level in slider 36. An example of a suitable transducer is disclosed in U.S. Provisional Application Ser. No. 60/042,169, filed Mar. 31, 1997, entitled "Magnetic Recording Head With PZT Sensor For Measuring Head To Disc Interference Levels" and assigned to the same assignee as the present application, which is hereby incorporated by reference. Other types of transducers can also be used, such as the specialized heads used during manufacturing for detecting and recording the location of asperities on the disc surface.

Figure 10:
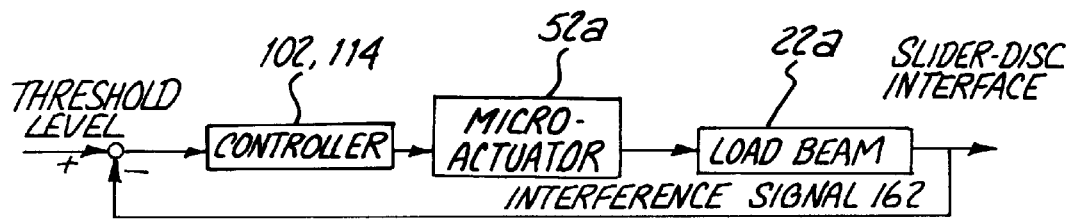
FIG. 10 is a diagram illustrating the closed-loop control function for the embodiment shown in FIG. 9.

FIG. 10 is a diagram illustrating the closed-loop control function. The interference signal 162 from the slider-disc interface is compared to a predetermined threshold level. When interference signal 162 exceeds the threshold level, controller 102 or 114 actuates microactuator 52a to apply the release force $F_3$, which reduces the total load force $F_a$ applied by load beam 22a and thus the mechanical interference between slider 36a and disc 40a. When interference signal 162 is less than the threshold level, controller 102 or 114 deactuates microactuator 52a, allowing load beam 22a to apply the maximum load force $F_1$.

Figure 8D:
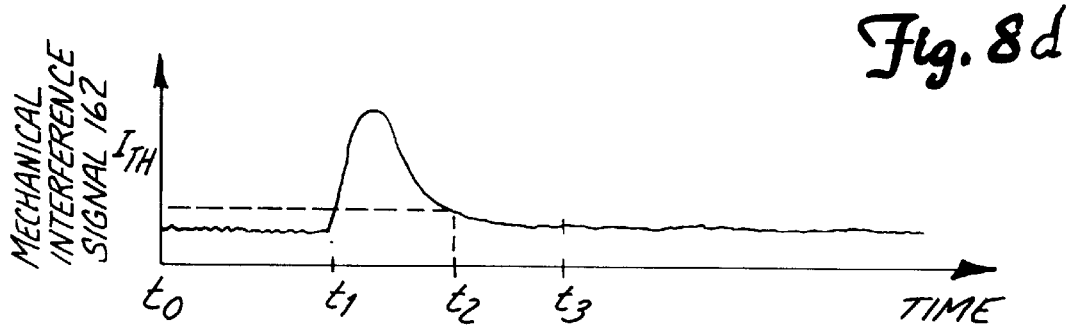

An example of an interference threshold level is shown in FIG. 8d, at $I_{TH}$. At time T0, disc 40a is stopped and the interference signal 162 is at a low background level which is below the threshold level $I_{TH}$. As mentioned above, at time T1, disc 40a begins to spin the interference signal 162 rapidly increases and then decreases as slider 36a takes-off from disc surface 40a. The interference threshold level $I_{TH}$ is preferably set to the interference level at which slider 36a just takes-off from the disc surface, at time T2. Once the interference signal 162 drops below threshold level $I_{TH}$, controller 102 or 114 deactuates microactuator 52a such that the total load force $F_a$ ramps back to its maximum value. Mechanical interference signal 162 can also be used during landing to apply the release force $F_3$ when sliders 36a comes in contact with the disc surface or its asperities.

Figure 11:
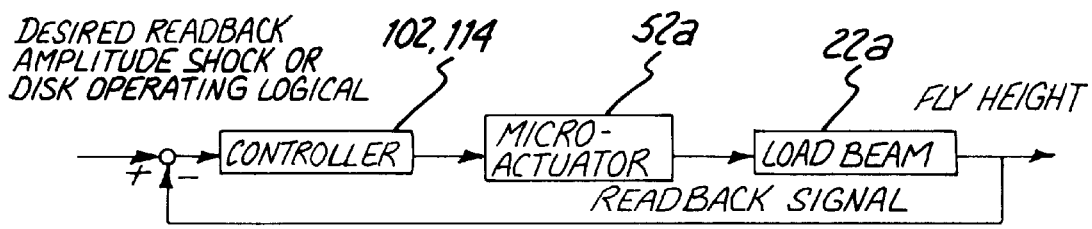
FIG. 11 is a diagram illustrating a closed loop fly height control system according to an alternative embodiment of the present invention.

FIG. 11 is a diagram illustrating a closed loop fly height control system according to another alternative embodiment of the present invention. The amplitude of magnetic signals being read from or written to the disc surface depends on the distance between the head and disc. With a high recording density, the magnetic domains on the disc surface become very small. Therefore, it is desirable to have the slider fly as close to the disc surface as possible. However, a low, constant flying height is very difficult to maintain because of different local air flow velocities and slider skew angles across the disc surface, manufacturing tolerances and existence of external vibration and shock.

As shown in FIG. 11, the head read back signal sensed by preamplifier 106 (shown in FIG. 6) and the external shock signal from accelerometer 144 (also shown in FIG. 6) can be used as a feedback signal to control microactuator 52 based on a comparison with a desired read back amplitude or operating shock level. In one embodiment, servo control processor 102 generates a logical signal which indicates whether disc drive 10 is in a read mode or a write mode. This signal can be used by the microactuator controller to adjust the release force and thus adjust the fly height of the slider.

CONCLUSION

The load force reducer of the present invention reduces stiction. The total frictional force that must be overcome to move an object from its supporting surface is proportional to the normal force pressing the object toward the surface. In a disc drive having a slider-disc interface with an ultra-thin layer of lubricant, the frictional mechanism is complex, but a higher load force will always result in a higher stiction force. For example, the total contact area between the slider and disc increases with the load force, thus making it harder for the slider to break away from the lubricant stiction and move relative to the disc. Also, depletion of the disc surface increases with the load force, which makes it even harder for the slider to move relative to the disc. By reducing the load force during take-off and landing, the stiction force is greatly reduced.

Figure 12:
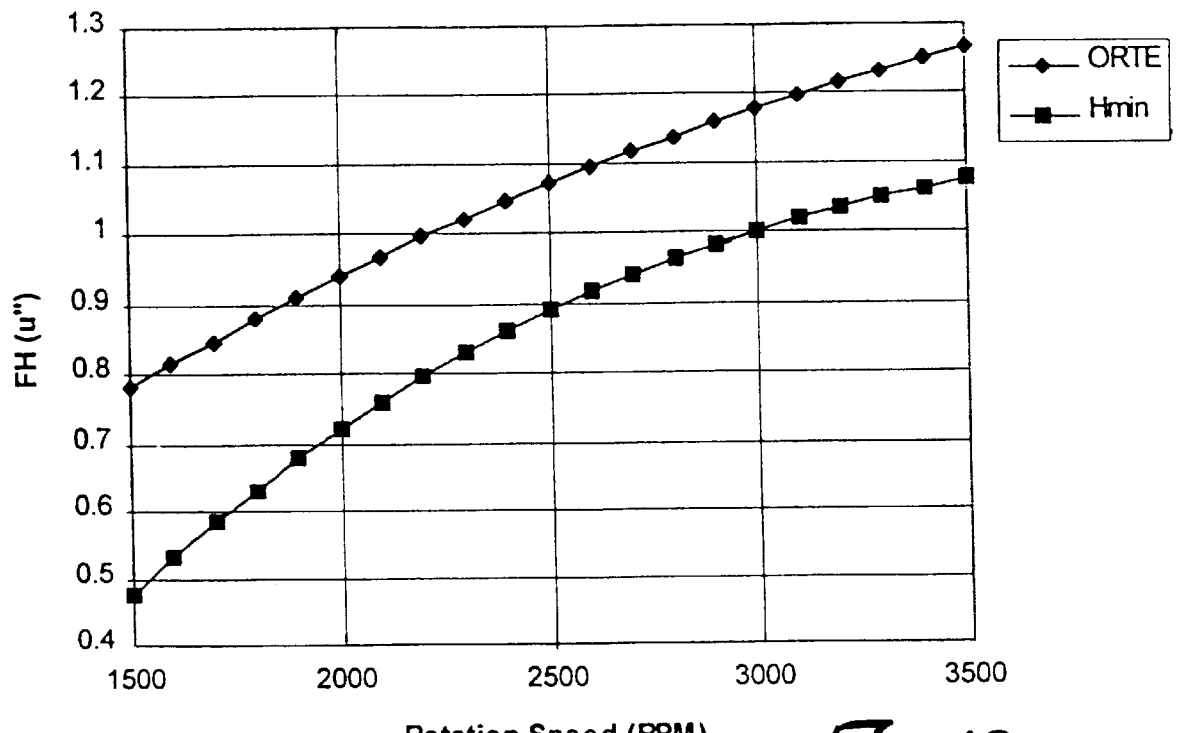
FIGS. 12–14 are graph of estimated take-off velocities for different load forces.
Figure 13:
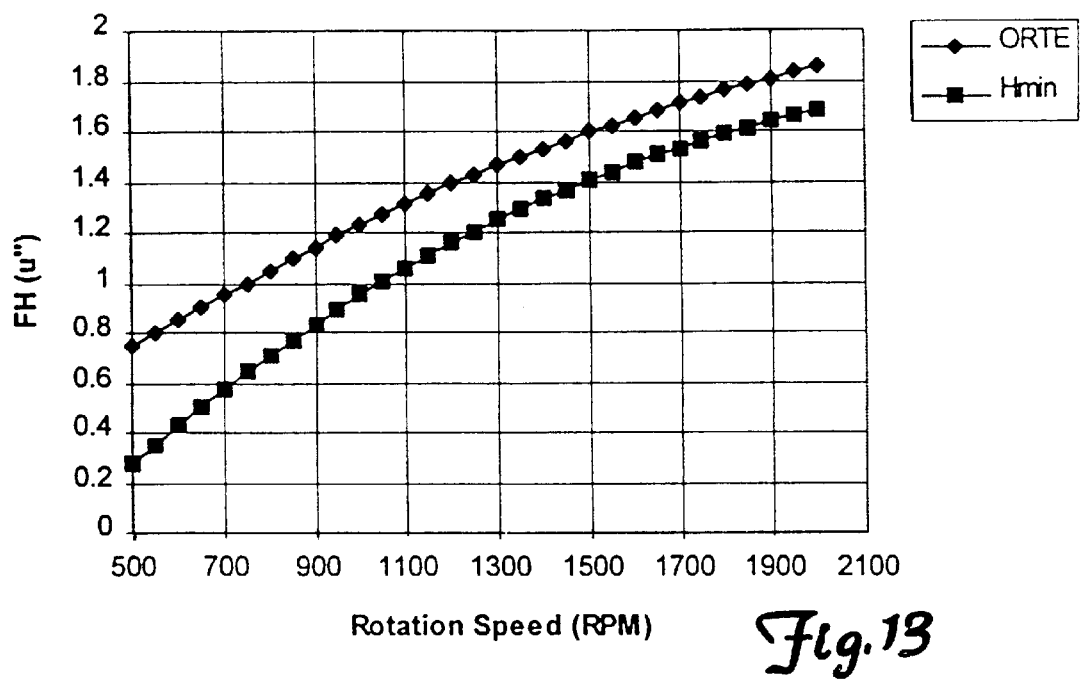
Figure 14:
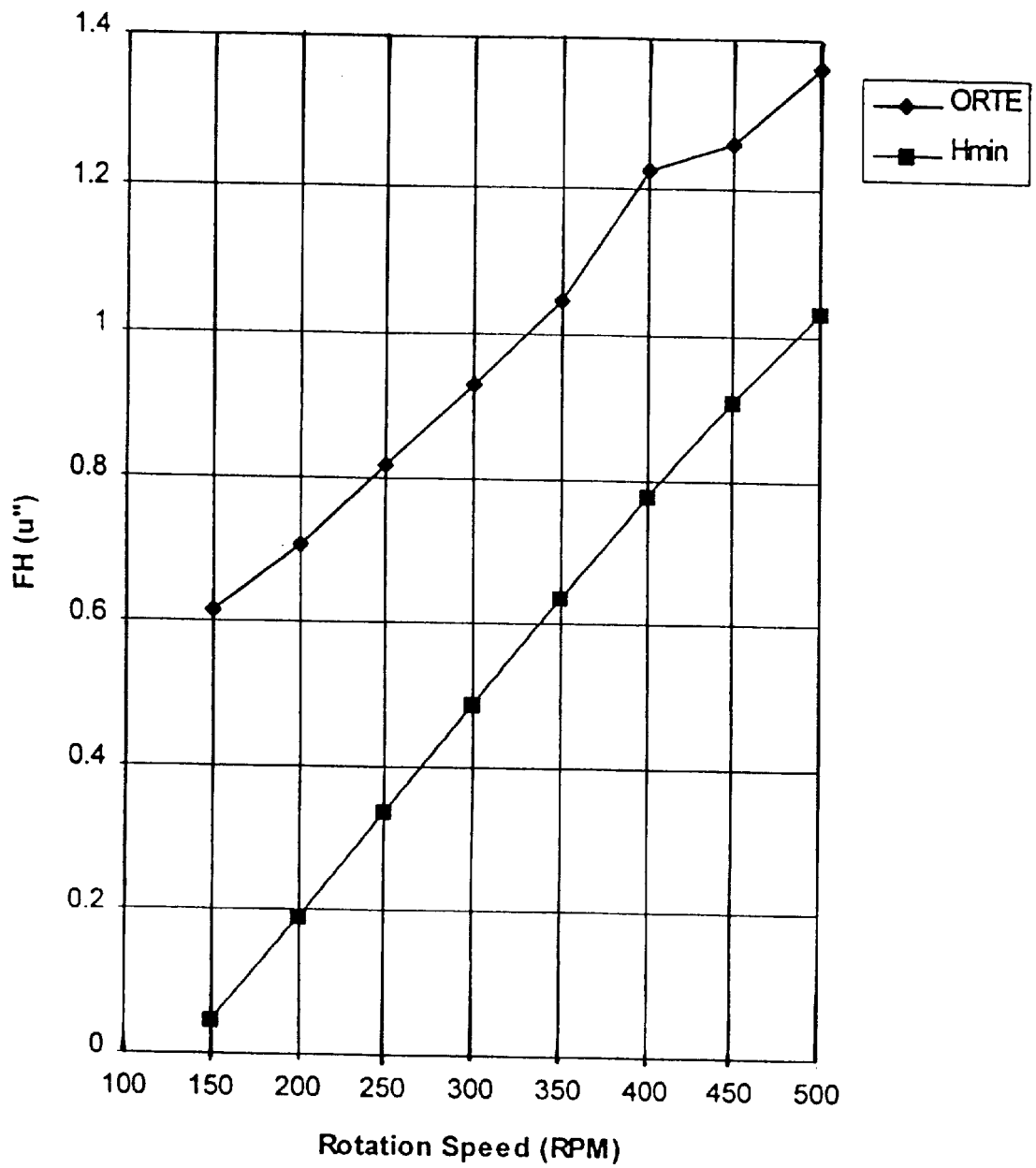

The load force reducer of the present invention also reduces the take-off velocity. The take-off velocities for different load forces were estimated using a dynamic simulation program an plotted in FIGS. 12–14. The legend "ORTE" refers to the flying height at the trailing edge of the outer rail of the slider. The legend "Hmin" refers to the minimum flying height anywhere on the slider surface, typically just forward of the trailing edge. In FIG. 12, assuming a 1.0 microinch disc avalanche, the take-off velocity was about 3000 rpm for a load force of 3.5 grams. In FIG. 13, for the same air bearing, the take-off velocity reduced to about 1000 rpm when the load force was reduced by half to 1.75 grams. In FIG. 14, the take-off velocity was further reduced to 500 rpm when the load force was reduced by ¾ths to 0.875 grams. In can be seen from FIGS. 12–14 that reducing the load force during take off and landing reduces the take-off and landing time duration. As the take-off and landing velocities decreases, the total relative distance the slider travels in contact with the disc is reduced. Therefore, a smaller load force leads to a reduced head wear rate and disc wear rate which in turn, prolongs the lifetime of the head and disc.

The load force reducer also reduces head wear due to local contact pressure. With the given micro-topography and roughness characteristics of the air bearing surface and disc surface, the differential wear rate per unit area on the slider crown increases with the local contact pressure, the travel distance between the slider and disc and the relative velocity during contact. The slider-to-disc contact area and the local maximum pressure over the contact area is reduced with a reduced load force.

Although the present invention has been described with reference to preferred embodiments, workers skilled in the art will recognize that changes may be made in form and detail without departing from the spirit and scope of the invention.

What is claimed is:

1. A method of loading a disc head slider through a load beam relative to a rotatable disc surface in a disc drive, wherein the load beam has a front surface, which faces the disc surface, and a back surface, which faces away from the disc surface, the method comprising:

supporting a microactuator between the back surface of the load beam and a cantilevered support beam, which extends along the load beam and is separated from the back surface by a gap;

applying a load force to the slider through the load beam, which forces the slider toward the disc surface;

initiating rotation of the disc surface such that the slider takes-off from the disc surface as a bearing develops between the slider and the disc surface;

reducing the load force to a reduced magnitude during take-off of the slider from the disc surface, wherein reducing comprises actuating the microactuator to generate a lifting force on the load beam in a direction toward the support beam and away from the disc surface; and increasing the load force from the reduced magnitude by reducing the lifting force after take-off of the slider from the disc surface.

2. The method of claim 1 and further comprising:

decelerating the disc surface from an operating RPM to zero RPM such that the slider lands on the disc surface;

reducing the load force to the reduced magnitude during the landing of the slider onto the disc surface; and increasing the load force from the reduced magnitude after the disc surface has reached zero RPM.

3. The method of claim 1 wherein the step of reducing the load force comprises reducing the load force as a function of a rotational velocity of the disc surface.

4. The method of claim 3 and further comprising:

sensing a rotational velocity of the disc surface;

comparing the rotational velocity of the disc surface to a predetermined take-off velocity;

performing the step of reducing the load force prior to initiating rotation of the disc surface and until the rotational velocity of the disc surface reaches the take off velocity; and performing the step of increasing the load force after the rotational velocity of the disc surface reaches the take off velocity.

5. The method of claim 1 and further comprising:

sensing acceleration of the disc drive due to operating shock; and adjusting the load force as a function of the acceleration.

6. The method of claim 1 and further comprising:

sensing a vibration generated by mechanical interference between the slider and the disc surface; and performing the step of reducing the load force when the vibration exceeds a predetermined level.

7. The method of claim 6 wherein sensing the vibration comprises sensing vibration generated in a piezoelectric sensor carried by the slider.

8. The method of claim 1 wherein the step of supporting a microactuator comprises supporting a stack of piezoelectric microactuator elements between the cantilevered support beam and the load beam and wherein actuating the microactuator comprises applying a voltage to the stack of piezoelectric elements to generate the lifting force as a function of the applied voltage.

9. The method of claim 1 wherein the step of supporting a microactuator comprises supporting an electromagnetic microactuator between the cantilevered support beam and the load beam.

10. The method of claim 9 wherein:

the step of supporting an electromagnetic microactuator comprises supporting a coil on the cantilevered support beam and a magnet on the load beam such that the coil and the magnet operate together form the microactuator; and the step of actuating the microactuator comprises generating a magnetic field with the coil, the magnetic field acting on the magnet to generate the lifting force.

11. The method of claim 1 wherein the step of increasing comprises increasing the load force according to a ramp function.

* * * * *

UNITED STATES PATENT AND TRADEMARK OFFICE
CERTIFICATE OF CORRECTION

PATENT NO. : 5,991,114
DATED : November 23, 1999
INVENTOR(S) : He Huang et al.

It is certified that error appears in the above-identified patent and that said Letters Patent is hereby corrected as shown below:

Col. 10, line 44, after "together" insert --to--.

Signed and Sealed this

Sixth Day of March, 2001

Attest:

NICHOLAS P. GODICI

*Attesting Officer*    *Acting Director of the United States Patent and Trademark Office*